No. 661,762. Patented Nov. 13, 1900.
C. HUNTSMAN, Dec'd.
K. HUNTSMAN, Administratrix.
MILK COOLER.
(Application filed May 31, 1900.)
(No Model.)
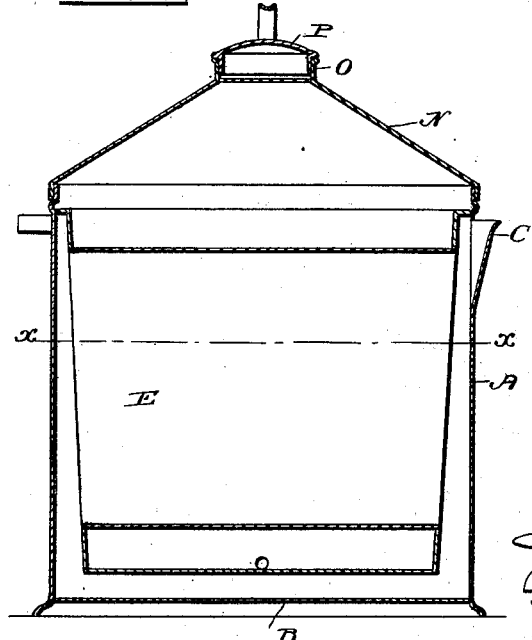
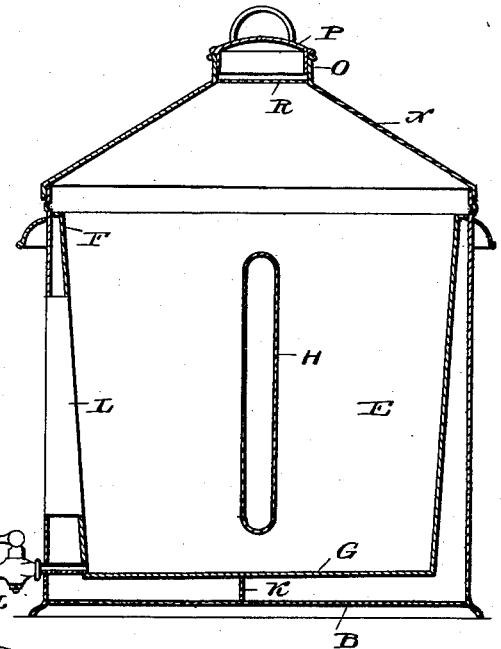
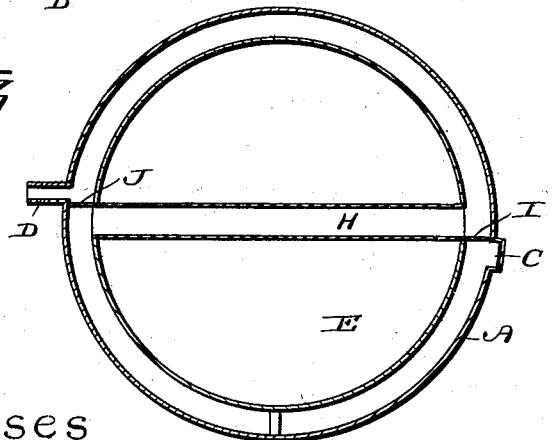
Witnesses
Inventor
Katharine Huntsman
by Thomas E. Burrow
Atty.

UNITED STATES PATENT OFFICE.

KATHARINE HUNTSMAN, OF BELLEVILLE, OHIO, ADMINISTRATRIX OF CLANCY HUNTSMAN, DECEASED.

MILK-COOLER.

SPECIFICATION forming part of Letters Patent No. 661,762, dated November 13, 1900.

Application filed May 31, 1900. Serial No. 18,662. (No model.)

*To all whom it may concern:*

Be it known that I, KATHARINE HUNTSMAN, a citizen of the United States, and a resident of Belleville, in the county of Richland and State of Ohio, administratrix of the estate of CLANCY HUNTSMAN, deceased, who invented new and useful Improvements in Milk-Coolers, do hereby declare the following to be a clear and exact description of said improvements.

This invention relates to certain new and useful improvements in milk-coolers; and the objects of the invention are, first, to construct a milk-cooler to separate the cream from the milk without mixing water with the same to cause the separation; second, to so construct the vessel that water can be forced around, underneath, and through the center of the milk in a continuous stream, if necessary, to cool the milk more rapidly, and, third, to make a cheap, novel, and efficient means for the purposes stated.

The objects will be fully explained by the accompanying drawings, in which—

Figure 1 is a vertical sectional view of the improved milk-cooler, showing the general construction of the same. Fig. 2 is a vertical sectional side view at right angles to that shown in Fig. 1, showing more fully the construction and arrangement of the parts constituting the same. Fig. 3 is a transverse sectional view taken on line $x\,x$, Fig. 1.

Similar letters of reference indicate the several parts throughout the views.

In the accompanying drawings, A indicates the outer receptacle, which is cylindrical in form and provided with the bottom B and is provided near the top with the inlet-port C and outlet-port D. The said ports will be fully explained in the operation.

E indicates the inner vessel, which is also cylindrical in form, but tapered toward the bottom. The top of the inner vessel is provided with the outwardly-projecting flange F. The said flange fits the inner wall of the receptacle A and is soldered to the same at a short distance from the top. The inner vessel E is provided with a slightly-inclined bottom G, the said bottom being about one inch above the bottom B of the outer receptacle A.

H indicates an elongated tubular passage which extends through the side walls of the inner receptacle E. The said tubular passage is shorter in vertical section than the inner vessel E, allowing a space within the said vessel above and below the tubular passage H. A vertical partition I extends downward from the flange F to the bottom B. A similar partition J is placed upon the opposite side of the vessel and also extends downward to the bottom B of the outer receptacle A. The said partitions are placed in line with the walls of the tubular passage H, one in line with each wall. A partition K is secured upon the bottom B and upon which rests the bottom G of the receptacle E. The said partitions will be more fully explained in the operation.

L indicates a tubular opening which extends through the side walls of the outer and inner cans and is provided with a suitable sheet of glass through which the operator can see to gage the cream and also when the milk is drawn from the cream.

M indicates a stop-cock to draw the milk and cream from the inner vessel which is commonly used in all milk-coolers. The outer receptacle is provided with a cone-shaped cover N, having an opening through the center, the said opening provided with an upwardly-projecting rim or flange O and suitable lid P and screen R.

The operation is as follows: The operator first removes the lid P and the cover N, placing the same in an inverted position within the top of the receptacle A. The milk is then strained through the screen R, which passes into the receptacle E. All foreign matter is then washed from the screen and the lid placed upon the receptacle in its normal position. Cold water is then allowed to flow into the opening or inlet C. The water passes one-half around the circumference until it comes in contact with the partition J, thence through the tubular passage H, thence around the other half of the water-space, and then is discharged through the discharge-pipe D.

It can be readily seen by those skilled in the art that the water-space can be filled with water, and when the milk and water become of the same temperature colder water can be supplied and the water forced from the discharge D; but when a continuous stream is used a perfect circulation surrounding underneath and through the center of the milk causes a quick separation of the cream from the milk.

Having fully described the invention, what is claimed as new, and desired to be secured by Letters Patent, is—

In a milk-cooler, the combination of an inner and outer receptacle, the inner receptacle smaller than the outer and secured within the same, forming a water-space surrounding and underneath the inner receptacle, a connecting-tube passing centrally through the inner receptacle and connecting with the water-space surrounding the same, partitions extending downward from the top of the water-space to the bottom of the same, a partition extending across the bottom within the water-space the said partition connecting with the vertical partitions, as shown and described.

In testimony whereof I affix my signature, in the presence of two witnesses, this 12th day of May, 1900.

KATHARINE HUNTSMAN,
*Administratrix of the estate of Clancy Huntsman, deceased.*

Witnesses:
W. A. DITTENHOEFER,
MAUD B. ACKERMAN.